United States Patent

[11] 3,601,490

[72] Inventor Kent E. Erickson
 Ridgewood, N.J.
[21] Appl. No. 606,364
[22] Filed Dec. 30, 1966
[45] Patented Aug. 24, 1971
[73] Assignee Keuffel & Esser Company
 Hoboken, N.J.

[54] LASER INTERFEROMETER
 10 Claims, 7 Drawing Figs.
[52] U.S. Cl. .................................................. 356/106
[51] Int. Cl. .................................................. G01b 9/02
[50] Field of Search .................................... 356/106–113

[56]  References Cited
 UNITED STATES PATENTS
3,420,600 1/1969 Mevers ........................... 356/106 X
3,409,375 11/1968 Hubbard ........................ 356/106
 FOREIGN PATENTS
1,076,835 7/1967 Great Britain ................. 356/106
1,085,350 7/1960 Germany ....................... 356/106
 OTHER REFERENCES
Lebesque et al.
"Wavelength or Length Measurement by Reversible Fringe Counting," Peck et al. JOSA Vol. 43 No. 6, 1953.

Primary Examiner—Ronald L. Wibert
Assistant Examiner—Conrad Clark
Attorneys—J. Russell Juten, Peter F. Willig, Lionel N. White and Milford A. Juten ABSTRACT: Feedback intracavity interference in a laser beam generator used as the light source in a single-pass interferometer is avoided by dividing the source beam at a polarizing beamsplitter to form reference and measuring beams polarized with antiparallel Poincare vectors. Birefringent elements disposed in the path of the polarized beams effectively rotate the vectors of the beams and create respectively contrapolarity in the beams. As a result the beamsplitter originally passing (or reflecting) the beams will subsequently reflect (or pass) the beams, thus preventing the return of laser beams to the generator cavity. The reference and measuring beams recombined at the beamsplitter thus form a composite beam having a resultant Poincare vector lying in a plane normal to the antiparallel Poincare vectors of the component beams. As the azimuth of the resultant vector traverses a full cycle with the phase change resulting from the movement of the interferometer measuring component, a plurality of polarizing elements disposed in the combined beam create optically discernible fringe signals which minimize at selected azimuths in the vector cycle. Multiple signal-counting components provide multiple-phase electronic signals which may be differentiated to remove DC components and provide signals which may be employed in reversible readout devices.

LASER INTERFEROMETER

BACKGROUND OF THE INVENTION

The phenomenon of interference fringes has long been recognized as an effective means for determining light source wavelength and has similarly found application in ultrasensitive distance-measuring devices. The Michelson Interferometer is representative of such a measuring device which functions basically by the comparison of light wavelength and a mechanical displacement of an optical component lying in the beam path of one component of a projected light beam.

Various interferometers have been available whose function is based upon the counting of interference fringes which occur during the movement of a mechanical component of the instrument. By appropriate circuitry, the number of fringes is counted and the distance calculated as a function of the wavelength of the particular light source employed. A distance moved by the measuring reflector may be converted directly from a particular order of fringes to convenient measurement units.

The practical application of interferometers in distance measuring has, in the past, been improved by the employment of cube corner reflectors in order to reduce the particularity with which mechanical adjustments within an instrument must be made; however, the resulting multiple paths have introduced discrepancies due to atmospheric diffraction, and the like. For example, the canting of wave fronts due to refraction results in poorer interference fringes than optimally obtained by parallel wave fronts. Multiple-pass interferometers of this type provide more precise measurement, however the rate of measurement is substantially reduced.

The single-pass configuration of interferometer, on the other hand, provides for more rapid displacement of the movable measuring element, but does not provide as fine measuring increments as the multiple-pass device. While such single-pass interferometers are more susceptible to error in lateral displacement of the optical elements of the device, they are far more insensitive to atmospheric disturbances than are the multiple-pass instruments. The use of selected frequency laser beam generators has recently found particular interest in the construction of a number of optical instruments. Interferometry, as well, has found benefit in the use of lasers, particularly single frequency output devices; however, for some purposes, the laser beam generator has not been completely satisfactory. In particular the single-pass interferometer configuration with a midpass retroreflector has been faced with a distinct difficulty due to the inherent characteristics of laser beam generators. A retroreflected laser beam can find its way back to the laser cavity, since outgoing and returning passes are coincident. As a result an interference occurs within the cavity and greatly deteriorates the performance of the laser device. This problem has heretofore prevented the construction of an entirely satisfactory retroreflector single-pass laser interferometer.

The desirability of distinguishing the direction of movement within an interferometer has long been recognized. Methods of differentiating directional movements in fringe counting techniques have been proposed and the phase comparison technique utilizing two signals in phase quadrature described by Peck and Obetz, J. Opt. Soc. Am., Volume 43, No. 6,505 (1953) continues to provide effective direction determination in fringe counting and distance measuring interferometers. The article by Peck and Obetz shows in addition the use of binary counters which are adapted to direct digital readout.

A reversible counting interferometer of the dual-phase comparison type is shown by Root in U.S. Pat. No. 2,604,004. Separate segments of the interfering beams are mechanically displaced by Root to provide fringes which are out of phase in the respective segments. The signals derived from the fringes during movement of the measuring element are similarly out of phase and form the basis for a "lag or lead" system of direction sensing in counting means. A similar triphase system for increasing multiples of fringe counts is described by Stephens in U.S. Pat. No. 3,127,465.

The susceptibility of such simple phase comparison interferometers to signal errors due to power variations, light levels, and the like has been recognized and a remedy based on differentiated signals to remove DC components has been described by Chitayat in U.S. Pat. No. 3,271,676. By such differentiation a pair of signals is derived which may be used in direction sensing counters.

It is to be noted, however, that these previous devices derived comparison signals from separate portions of their respective light beams and as a result the interference signals were not based upon phase-differentiated fringes of a single measuring beam, but rather upon fringes from a plurality of distinct optical beams within the particular interferometer system. Since, particularly in long distance measuring, each of these distinct paths were, of necessity, relegated to separate spacial paths, different atmospheric exposures introduced unknown conditions which effected the true presentation of precise fringe formation. In the present invention all signals are derived from a single coherent light beam throughout the system and as a result a true comparison of signals is attained.

SUMMARY OF THE INVENTION

The present invention relates to interferometers. More particularly, the invention relates to reversible counting interferometers capable of measuring minute increments over relatively long distances.

The interferometer of the present invention utilizes a single frequency laser light source and includes retroreflector elements disposed in the reference and measuring beam paths so as to provide coincidence of the outgoing and returning beam paths, particularly of the measuring beam. By such beam path coincidence the measuring light beam of the interferometer is subjected to the same atmospheric disturbances during the outgoing and returning passes. Refractions of the beam due to such disturbances are thereby counteracting and the resultant refraction, otherwise of substantial moment over long distances, is negligible.

Elimination of refraction in the beams of the interferometer is of particular advantage, since the beam wave fronts are maintained precisely parallel in the returning passes of the reference and measuring beams. Such parallelism provides the optimum situation for the formation of well-defined optical interference fringes.

The parallelism of wave fronts of outgoing and returning beams has heretofore been a great disadvantage in devices utilizing a laser light source, however, since the feedback of returning wave fronts into the laser cavity will, as is well known, interfere with the operation of the laser. In order to avoid intracavity interference with the laser beam generation, the present invention utilizes polarizing elements, such as a polarizing beamsplitter, disposed with birefringent elements in the paths of the reference and measuring beams of the interferometer.

As a means of generally describing the light polarization and polarizing effects utilized in the present invention, reference is made in this specification and in the appended claims to the Poincare characteristics of the light beams or beam components involved. The POINCARE SPHERE (H. Poincaré, *Theorie Mathematique de la Lumiere*, Paris, Georges Carre, Vol. 2, (1892) Chap. 12) was formulated as a basis for relating any of an infinite number of states of polarization of monochromatic light beam as a point on the surface of a sphere. The coordinates of such a point, with respect to the center of the sphere, establishes the ellipse of polarization and the orientation of the ellipse, the radius of the sphere at such point representing the polarization, or Poincare, vector of the beam. Vectors disposed above the equatorial plane of the sphere are considered as representing right-handed polarity; conversely, below the equatorial plane, left-handed polarity.

Birefringent elements, various crystalline media for example, effect the polarity of transmitted light to the extent that the orientation of the Poincare vector is deviated within the sphere. By proper selection of birefringent elements, the deviation of the vector may be controlled as desired. A quarter-wave plate, for example, is known to deviate the Poincare vector from polar oriented, i.e. circular polarization, to equatorial oriented, i.e. linear polarization.

The combination of two beams of equal intensity and exactly opposite polarization, i.e. when the Poincare vectors are antiparallel, will form a resultant beam which has a Poincare vector lying in a plane normal to the antiparallel vectors of the original beams. The azimuth of the resultant vector is determined by the phase difference between the original beams.

It will thus be seen that an infinite number of antiparallel vectors may exist in accordance with the polarity of the original light beam. Likewise, an infinite number of normal vector planes may exist. As noted, a single North- and South-polar orientation of antiparallel Poincare vectors will represent opposite circular polarity with a resultant equatorial plane of linear polarity.

According to the present invention a coherent interferometer input beam is directed from a laser generator onto a polarizing beamsplitter which divides the input beam into a reference beam and a measuring beam having antiparallel Poincare vectors. During the passage of the beams to and from the retroreflectors, birefringent elements are encountered which reorient the vectors and effectively transpose the polarities of the beams.

The beams are thus variously reflected and transmitted by a major polarizing beamsplitter element before and after passing to the retroreflector components. By this arrangement substantially no portion of the light beams returning from the reference or measuring reflecting surfaces is transmitted to the laser beam source.

Polarization of the measuring and reference beams is further utilized for sensing interference fringes generated in the interferometer. As previously noted, the resultant Poincare vector of the composite beam formed, optimally, of equal intensity measuring and reference beams of antiparallel vectors will be in the normal plane and will vary in azimuth according to the phase difference of the component beams.

Although the original intensities of the component beams are purposely unbalanced in favor of the longer measuring beam in an attempt to compensate for refraction losses over the beam path and achieve the optimum equality of beam intensities in the composite beam, it should be realized that the optimum is seldom accomplished. The resultant Poincare vector will more often be displaced at some angle from the optimum plane and the locus of this vector as it varies in orientation with the phase difference of the component beams will be a cone. In the present description, however, the balance of beam intensities will be assumed to be the optimum in the interest of simplicity of the disclosure.

As the phase difference between the measuring and reference beams proceeds through a full cycle with movement of the measuring beam reflector element, the resultant Poincare vector of the composite beam similarly sweeps through a full cycle in its plane. The polarization of the composite beam will thus vary in cyclic manner and a polarizing element disposed in the composite beam will transmit that beam in intensities varying in like cyclic manner. A detector, such as a photoelectric element, capable of distinguishing varying light intensities will, in association with the polarizing element, provide an intelligible signal representing the movement of the resultant vector during its cyclic sweep.

The selection of a proper polarizing element can in general be readily accomplished in view of the recognized fact that a polarizing element, characterized by its refusal to transmit a light beam having a polarization of a Poincare vector, $W_1$, will transmit a light beam of a Poincare vector, $Vc$, in an intensity proportional to $\sin^2\theta/2$, where $\theta$ is the angle between $W_1$ and $Vc$. It will be seen, therefore, that when $W_1$ and $Vc$ lie in the same plane, e.g. when the polarizing element is a linear polarizer and the composite beam is linearly polarized, $W_1$ and $Vc$ will coincide once during each cyclic sweep of $Vc$ when the azimuth of $Vc$ equals that of $W_1$. As a result $\theta$ will pass through zero once during each cycle and at that time no light will be transmitted by the polarizing element to the photoelectric element and a perfect null signal will be obtained.

As noted, due to inequalities in component beam intensities the resultant Poincare vector of the composite beam will seldom describe a plane, thus $Vc$ will rarely coincide precisely with $W_1$; however, cyclic movement of $Vc$ will provide a generally sinusoidal signal which can be usefully employed as will later be described.

It will be apparent from the foregoing that a plurality of polarizing elements of characteristic Poincare vectors $W_1$, $W_2$, $W_3$ .... $Wn$ of varying dispositions, preferably and optimally on the locus of the cycling resultant vector, $Vc$, will provide a like plurality of minimal signals having phase relationships established by selective predisposition of the azimuths of vectors $W_1$, $W_2$, $W_3$ .... $Wn$. For example, polarizing elements disposed in a linearly polarized composite beam with their characteristic vectors, $W_1$, $W_2$, $W_3$, lying in the plane of $Vc$ and having relative azimuths of 0°, 90°, 180° will provide, in association with respective photoelectric elements, sinusoidal signals varying in phase by 90°. Electronic differencing of pairs of signals differing by a 90° will then provide, from three sinusoidal signals, a pair of signals, without DC components, which can be effectively utilized as input signals for any of the presently available reversible digital counters.

A phase-comparing means can be utilized to determine from the detector signals the direction of movement of the measuring beam reflector. Distinction of the direction of movement and an electronic counting of signal cycles, i.e. interference fringes, can be combined to provide direct digital readout in convenient units of distance along the measuring axis of the device.

An object of the present invention is to provide a reversible interferometer useful in measuring minute increments of relatively long distances. Another object of the invention is to provide an interferometer with low sensitivity to atmospheric disturbances. Yet another object of the invention is to provide a single pass laser interferometer operable with a midpoint retroreflector. Still another object of the invention is to provide a reversible interferometer with direct readout measurement capabilities. Another object is to provide a multiple-signal interferometer having a single coherent light beam throughout. A further object is to provide an interferometer with high optical efficiency. Another object is to provide a single light source multiple-axis interferometer. Yet another object is to provide an interferometer capable of being readily adapted to provide a selectable plurality of interference fringe signals for a like plurality of signal detectors whereby, inter alia, the precision of the interferometer may be readily varied. These and other objects of the invention will become apparent in the following description.

DESCRIPTION OF THE PREFERRED EMBODIMENTS

Figures 1, 2:
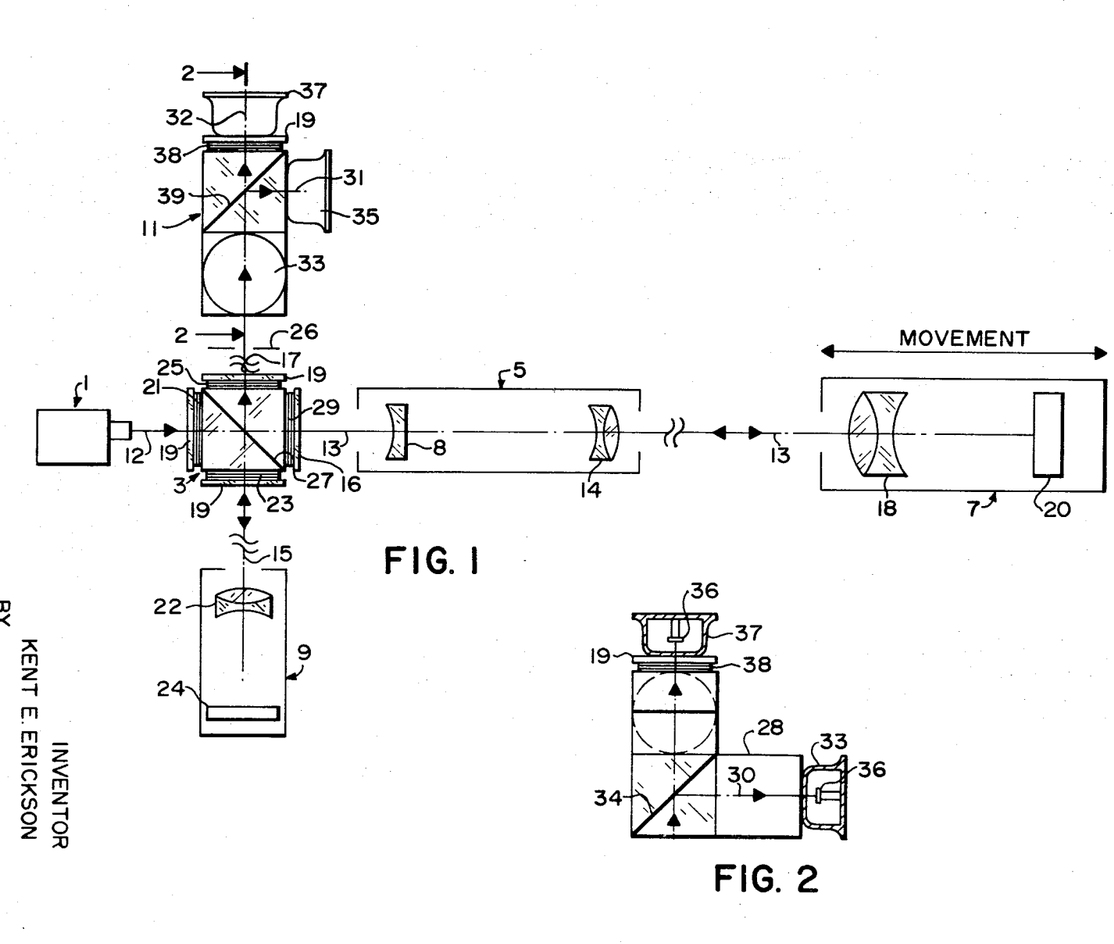
FIG. 1 presents a schematic representation of an interferometer according to the present invention in a single pass configuration.
FIG. 2 is a section of the detector assembly taken along the line 2—2.

A preferred embodiment of the present invention comprises a device wherein the Poincare vectors of the beams within the device vary between polar orientation and disposition in the equatorial plane; that is, between circular and linear polarization. As schematically shown in FIG. 1, such a configuration of the present invention comprises a single frequency laser 1, an interference assembly 3 located in the path of the laser beam 12, a telescope 5 and a movable lens/mirror retroreflector assembly 7, both located in the path of measuring beam 13, and a lens/mirror retroreflector assembly 9 located in the reference beam path 15. A detector assembly 11 is disposed in the recombined beam path 17 emerging from the interference assembly 3.

The operation of the interferometer laser source 1 emits a coherent light beam 12 which in the present embodiment is naturally linearly polarized with its Poincare vector lying in the equatorial plane. The beam passes through a protective glass plate 19 and then through a half-wave plate 21 which reorients beam 12 to give a desired ratio of polarization to the beam. The ratio will preferably be about 1:2 with respect to the reference and measuring segments of the beam. That is, approximately one-third of the beam intensity will be polarly deviated from the normal linear polarization of the input beam in order to establish the reference segment of the light beam. The beam thus partially deviated strikes the polarizing beamsplitter 27 which is oriented to transit completely the natural linearly polarized input beam 12 and to reflect the remainder of the beam polarly disoriented by half-wave plate 21.

The measuring beam 13 passes through a quarter-wave plate 29 oriented with its axes at 45° to the plane of FIG. 1 where the Poincare vector is reoriented and the linear polarity of the beam is converted to a circular polarity. The measuring beam 13 emerges from the interference assembly 3 through the protective plate 16 and enters a telescope assembly 5 comprising common negative and positive lens elements 8, 14 where it is magnified from a diameter of approximately 1 millimeter to a diameter of about 5 millimeters.

The measuring beam 13 is magnified in this manner in order to give a reasonable immunity from lateral misalignment of the measuring reflector carriage with respect to the beam without making the beam unduly sensitive to atmospheric turbulence. It has been found that an instrument of this configuration will tolerate misalignment of about 10 percent of the light beam diameter.

The measuring beam 13 passes over the distance to be measured and strikes the retroreflector assembly 7 where it is focused by lens element 18 onto the plane-reflecting surface of mirror 20. The reflector assembly 7 is normally mounted in a measuring head for movement along the path of the measuring beam by means not shown. The measuring beam 13 reflected from assembly 7 returns with wave fronts parallel to the outgoing wave fronts along the same path originally taken in passing through the telescope and again passes quarter-wave plate 29 where its circular polarity is returned to a linear polarity; however, as a result of the double-passing of the quarter-wave plate 29 the Poincare vector of the beam has been shifted contra to its original orientation and the axis of polarization has been altered by 90° from that originally transmitted by polarizing beamsplitter 29. Because of this polarity alteration the measuring beam is substantially entirely reflected by the polarizing beamsplitter 27 and essentially none of the light is allowed to return to the laser cavity where it would otherwise interfere with the generation of the beam 12.

The polarizing beamsplitter is constructed in the usual manner to provide reflectance properties of $rs=97.5$ percent and $rp=0.5$ percent. In the embodiment of FIG. 1, beamsplitter 27 was prepared by vacuum coating a face of a crown glass prism ($n=1.69$) in sequence with layers of cryolite, cerium oxide, cryolite, cerium oxide, and cryolite, each layer having a thickness of a half-wave length of light in 4,200 A.U. A matching prism was then adhered to the outermost cryolite layer with Kodak optical cement ($n=1.60$) to form the beamsplitter 27. The birefringent half-wave plate 21 and quarter-wave plates 23, 25, 29 may be prepared from any suitable material. The preferred substance in the present embodiment is natural mica wafers.

The portion of the input beam 12 reflected by the polarizing beamsplitter 27 proceeds through the quarter-wave plate 23 which, by reorienting the Poincare vector, imparts circular polarity to the beam, thence to the retroreflector assembly 9, comprising a focusing lens 22 and a mirror 24, and returns through the quarter-wave plate 23. As with the measuring beam 13 the reference beam 15 has now double-passed the quarter-wave plate and is linearly polarized to an axis altered 90° from the original polarity reflected by beamsplitter 27. Essentially all of the reference beam 15 therefore passes through the polarizing beamsplitter 27 and no portion is reflected back into the laser cavity, thereby protecting the laser operation from feedback interference.

The returning measuring beam 13 and the reference beam 15 combine at the polarizing beamsplitter 27. The combined beam 17 consisting of the two beams of orthogonal polarity, i.e. having antiparallel Poincare vectors, passes through quarter-wave plate 25 oriented with its axes at 45° to the plane of FIG. 1. The effect of wave plate 25 is to reorient the antiparallel vectors from the equatorial plane to polar disposition and thus to impart opposite circular polarization to the measuring and reference components of the composite beam 17. As previously noted, the interference of two spatially coherent beams of antiparallel Poincare vectors, i.e. opposite circular polarity, in the present embodiment, results in a composite beam of linear polarity, having its Poincare vector in the equatorial plane and whose azimuth of polarization depends upon the phase difference between the two interfering beams. This phase difference is in turn determined by the location of the retroreflector 7, i.e., by the length of beam 13. The resultant Poincare vector of the composite beam will be seen to traverse the full 360° of azimuth in its plane with each wavelength increment of beam 13. Although equality of beam intensities will not be achieved in all instances, such intensity variances will not effect the basic operation of the present invention and will further be compensated for as described below. The composite beam 17 of resultant linear polarity then passes to the detector assembly 11. The diameter of beam 17 may be varied as desired by an adjustable stop 26.

Detector assembly 11 comprises a pair of polarizing beamsplitters 34, 39 and a plane polarizer plate 38 disposed in series along the path of beam 17. The polarizing beamsplitters are constituted so as to reflect approximately 50 percent of light polarized with its electric vector normal to the plane of incidence and almost none of the light polarized with its electric vector parallel to the plane of incidence. The beamsplitting interfaces of beamsplitters 34, 39 of the present embodiment have polarized reflectance properties of $rs=46$ percent and $rp=1.7$ percent. These beamsplitters were prepared by vacuum coating a glass prism ($n=1.51$) with a half-wavelength thick layer (at 4,700 A.U.) of each of magnesium fluoride and cerium oxide. The assembly is completed by adhering a second prism to the coatings with optical cement ($n=1.57$). The polarizing beamsplitters 34, 39 are disposed with respect to each other as seen in FIGS. 1 and 2, so that the plane of incidence of beamsplitter 34 is orthogonal to the plane of incidence of beamsplitter 39. The axis of polarity of the linear polarizer 38 is inclined at 45° to the planes of incidence of the polarizing beamsplitters 34, 39.

Photoelectric detector units 33, 35, 37 are located with respect to polarizing beamsplitters 34, 39 and linear polarizer 38 so as to intercept the light reflected from the beamsplitters and passing through the polarizing plate, thereby providing a current generation pattern corresponding to the light reflected and transmitted respectively by the beamsplitters and polarizer.

The amount of light incident upon the detectors will be a function of the azimuth of polarization of beam 17 as such azimuth relates to the axes of polarization of the beamsplitters 34, 39 and the polarizer 38. It will be apparent, therefore, that the position of the measuring reflector 7 along beam 13 will determine the azimuth of the axis of polarization of beam 17 and that a change in position of the reflector will vary the azimuth of polarization.

Figure 5:
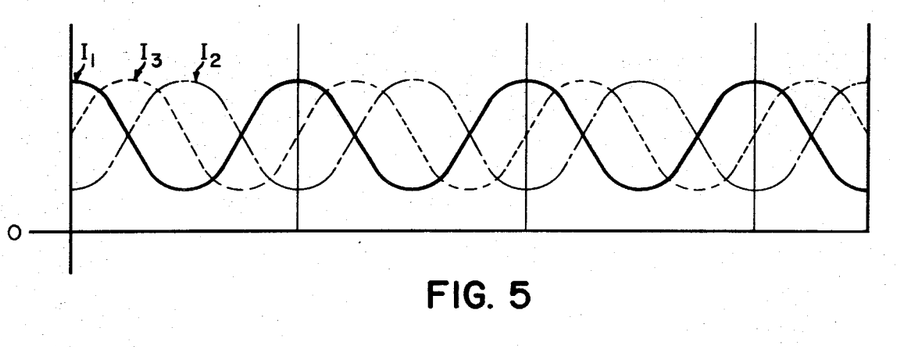
FIG. 5 is a diagram of the output signals from the detectors in the present device.

As the retroreflector 7 is moved longitudinally of beam 13 the azimuth of polarization of beam 17 aligns itself successively with respect to the axes of polarizers 34, 38, 39 and the signals $I_1$, $I_3$, $I_2$ at detectors 33, 37, 35 are minimized in sequence as shown in FIG. 5. The beams incident upon detectors 33, 37, 35 are thus modulated with relative phases of 0°, 90°, 180°.

It will thus be seen that the measuring beam 13 and the combined interference beam 17 are respectively spatially coherent throughout the device and thus the optical signals are subjected to the same atmospheric turbulences and the like throughout all passes until the detector assembly 11 is reached. As is indicated in FIGS. 1 and 2, the paths of the resultant linearly polarized beams 30, 31, 32 are substantially equal and due to their short span are subjected to no substantial exterior influences.

The effect of a mismatch in intensity between reference beam 15 and measuring beam 13 is simply to add a circularly polarized component to the combined beam 17. This circularly polarized component produces no modulation at the detectors and results merely in DC components being added to the detector signals. Since, as will be described below, the detector signals are differenced to eliminate all DC components, the effect of intensity mismatch is eliminated.

Figure 3:
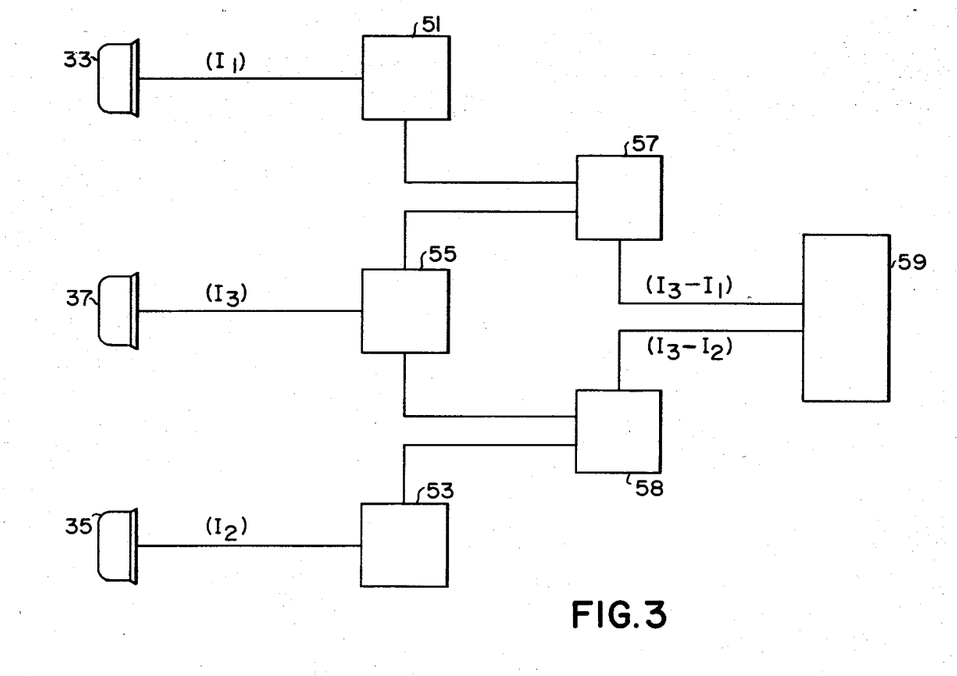
FIG. 3 is a schematic drawing of one type of circuitry in a fringe counter assembly of the present invention.

The differencing of the detector signals may be accomplished with relative ease in the circuitry of an electronic counter and may be described most readily by reference to the schematic representation of FIG. 3.

Figure 6:
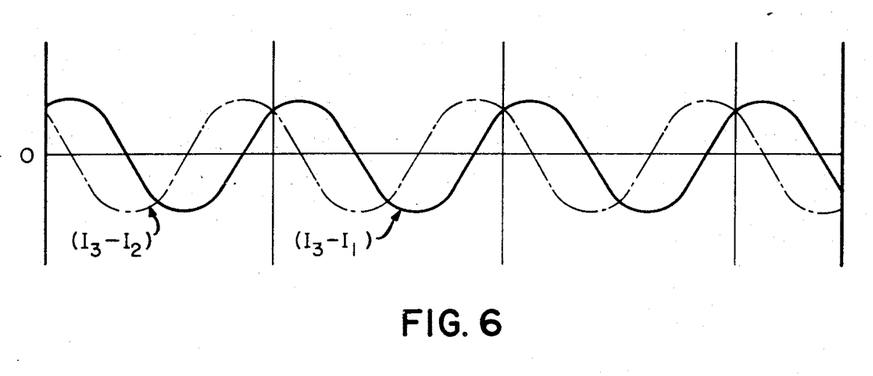
FIG. 6 is a diagram of the differentiated output signals as fed to the counter.

The sinusoidal output signals $I_1$, $I_2$, $I_3$ (FIG. 5) from the detectors 33, 35, 37 are individually amplified in amplifiers 51, 53, 55 respectively with the amplifier gain adjusted to provide substantially equal maximum current in each of the detector signals. The amplified signals are then sent to differential amplifiers 57, 58 and the resulting differential signals $(I_3-I_1)$ and $(I_3-I_2)$ (FIG. 6) go to electronic counter 59 of the type readily available and used in reversible counting.

By the use of differential signals generated by the differential amplifiers, the DC component of the original signals from the detectors is removed and the operation of the interferometer is relatively insensitive to changes in the laser output or variation in the visibility of the fringes.

Thus the sinusoidal and cosinusoidal signals $(I_3-I_1)$ and $(I_3-I_2)$ fed into the electronic counter 59 provide the basis for reversibility of the interferometer, since movement in the measuring reflector in the first direction along the measuring beam path will cause the phase of the sinusoidal signal to lead that of the cosinusoidal signal and, conversely, opposite movement of the measuring reflector will result in the cosinusoidal signal leading that of the sinusoidal signal.

Figure 7:
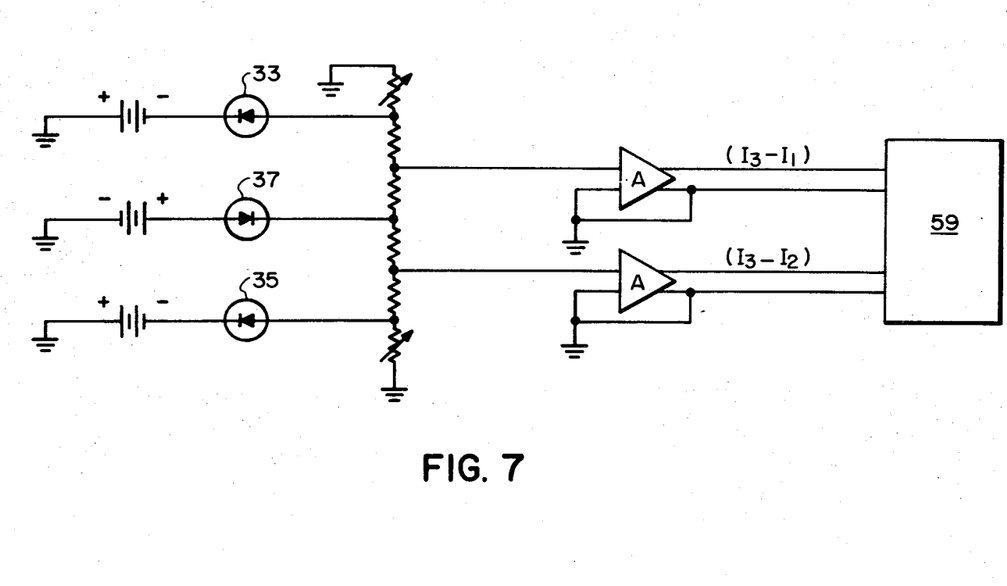
FIG. 7 is a schematic diagram of a preferred signal differentiating circuit.

While the circuitry of FIG. 5 provides simple reference for the above explanation of signal differentiation, a preferred differentiating circuit is shown in FIG. 7. By balancing the signals from detectors 33, 35, 37 in this circuit the signal differentials are established prior to amplification. In this manner the signal balance is independent of any amplifier gain. Representative values of the elements of the circuit include biases of about 15 volts on the detectors and 1.0 k. ohm resistors. Any appropriate operational amplifier may similarly be used. In operation the variable resistors are adjusted to a point where the DC components are cancelled from the signals.

Calibration of a digital readout counter can, of course, depend upon the wavelength of the laser beam source since, for example, with respect to the single-pass interferometer shown in FIG. 1, a half-wavelength movement of the measuring reflector will result in a change of one wavelength distance of the measuring beam. Such a full wavelength change in the measuring beam path will result in one full cycle of modulation at any one of the detectors. Interferometer configuration employing multiple passes will, of course, result in more rapid modulation with movement of the measuring reflector—for example, a double-pass cube corner interferometer will register a full modulation cycle with a quarter-wavelength movement of the measuring beam reflector. Thus, there results increased accuracy in measurement with multiple-pass interferometers. The maximum rate of measurement or movement of the measuring beam reflector is, however, reduced by a like multiple.

In the construction of a laser interferometer according to the present invention an HE-NE laser light (6,328 A.U.) source of 0.1-milliwatt output is used. The polarizing beamsplitters and the various half- and quarter-wave plates are prepared with reference to the wavelength of the input light beam. Effective detector elements have been found to be silicon diodes 36 having a dark current of less than $10^{17}$ amps which is equivalent to an optical signal of about $2 \times 10^{16}$ watts. These diodes have a typical capacity of 5.5 pfd. and a resistance of about 95 ohms. The characteristic cutoff frequency of the silicon diodes is about 300 MHz. It has been found practical, therefore, to employ detector amplifiers having a frequency response which is flat to 2 MHz. This is well above the 1 MHz. maximum counting rate of presently available bidirectional counters.

The interference and detector assemblies of the present invention may also be employed in other than single-pass interferometer configurations. By reference to FIG. 4 it will be seen that the polarizing techniques previously described may be well adapted to an instrument of the multiple-pass type which in some instances may be preferred where it is desired to obtain finer measurements and where the instrument is to be made more immune to lateral misalignment of the reflector unit with respect to the measuring beam.

Figure 4:
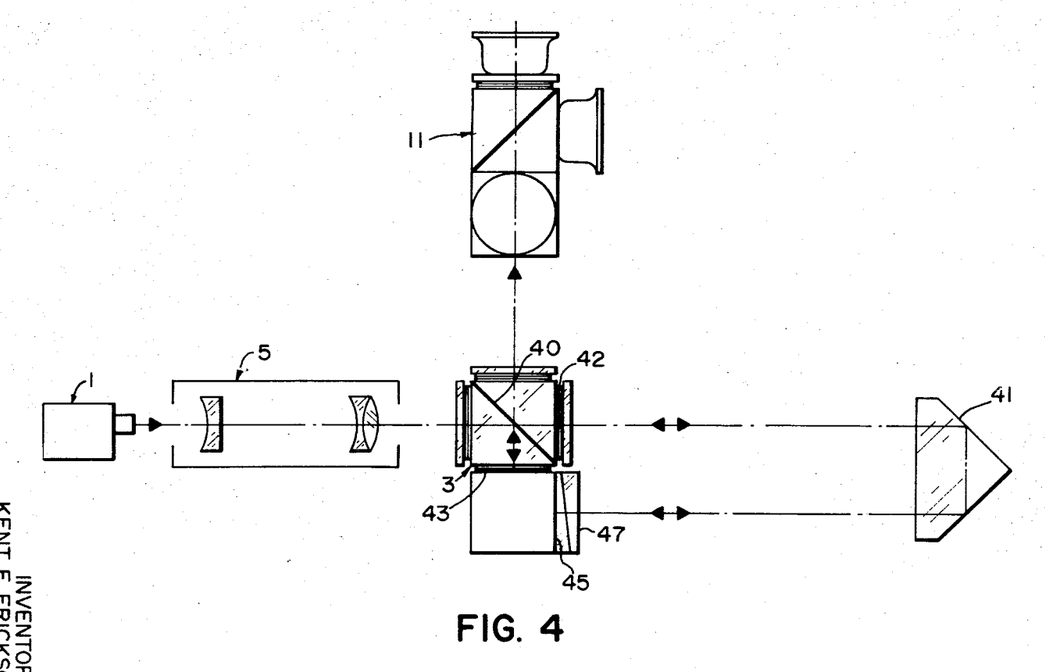
FIG. 4 schematically shows another embodiment of an interferometer of the present invention in a multiple pass configuration.

The dual-pass interferometer shown in FIG. 4 operates principally in the same manner as the single-pass instrument of FIG. 1. In the dual pass configuration the reflectant measuring beam component comprises a plane-reflecting surface 45 and permanently adjusted corrective wedges 47. Since the measuring beam is doubly folded through the cube corner reflector 41, this should be taken into consideration in the construction of the wave plate 42 in order that the combined effect of the plate and the cube corner reflector are equivalent to a quarter-wave plate with its axes at 45° to the plane of FIG. 4. In this manner, the proper 90° alternation of the linear polarization axis of the measuring beam may be accomplished in order to obtain substantially total reflectance of the returning beam from beamsplitter 40. The reference beam reflector comprises plane surface reflector 43. As previously noted, the relationship between the distance of movement of the measuring arm reflector 41 in the dual-pass configuration and the number of modulation cycles will vary by a factor of two from those of the single-pass configuration.

The telescope 5, used for enlarging the source beam as previously noted, is preferably located in front of the beamsplitter unit in the cube corner configuration. Such location is preferred since the alignment of the reflector in the measuring beam is more critical in such a configuration and misalignments due to telescope positioning may thus be more readily avoided.

It will be apparent that any number of reflector and retroreflector combinations may be employed to obtain various multiples of accuracy in an interferometer. For example, a cube corner and lens/mirror retroreflector may be combined in a single configuration in order to utilize the respective advantages of each and to obtain a corresponding increase in accuracy of measurement. Conversely, a very simple cube corner retroreflector may be employed in a single-pass configuration while taking advantage of the substance of the present invention. Therefore, although the center of a cube corner retroreflector is notorious with respect to aberrations, the described combination of quarter-wave plates and polarizing beamsplitters may be employed to obtain relatively coarse measurements in simpler systems without loss of the consistently high degree of accuracy in fringe counting capability.

Multiple axis fringe counters may also be constructed in accordance with the present invention. By inserting an appropriate beamsplitter unit in the measuring beam 13 of FIG. 1, for example, a portion of the beam will be diverted to provide a source beam for a duplicate system whose measuring retroreflector moves along the Y-axis of measurement, assuming the movement of measuring unit 7 of FIG. 1 is in the X-axis of measurement. In order to avoid introducing a circular polarity to the beam which is to form the light source of the Y-axis unit, the quarter-wave plate 27 (FIG. 1) of the X-axis unit is relocated to the rear of the beamsplitter unit serving to divide beam 13 so that only the X-axis measuring beam will be effected by the quarter-wave plate.

An effective component for dividing out the Y-axis source beam from measuring beam 13 has been found which uses a beam-splitting layer having reflectance properties of $rs=56.0$ percent and $rp=2.0$ percent. Such a beamsplitter may be prepared by vacuum coating a surface of a crown glass prism ($n=1.51$) with half-wavelength thicknesses (at 4,800 A.U.) of magnesium fluoride, cerium oxide, and magnesium fluoride, and cementing a second similar prism to the composite layer with optical cement ($n=1.60$).

An additional Z-axis system may similarly be prepared with the light source being provided by diverting a portion of either the X- or Y-axis measuring or source beams by appropriate beamsplitters in a manner described above.

As previously seen with respect to the elimination of intracavity feedback interference in the laser device, the combination of the quarter-wave plates and polarizing beamsplitters in each of multiple axis systems prevents leakage of signals from one system to another and thereby prevents signal interference.

The above embodiments have been presented for the purpose of illustration and should not be taken to limit the scope of the present invention. It will be apparent that the described embodiments are capable of many variations and modifications which are likewise to be included within the scope of the present invention as set forth in the appended claims.

What is claimed is:

1. An interferometer comprising:
  a. a source of a primary beam of coherent light;
  b. means for dividing said primary light beam into a pair of secondary beams having characteristic Poincare sphere vectors;
  c. means for combining said secondary beams to form a composite beam having a resultant Poincare vector;
  d. means disposed in substantially the whole of the aperture of at least one of said primary, said secondary or said composite beams for orienting the Poincare vectors of the secondary beam components of said composite beam into antiparallel North-South disposition with reference to the Poincare sphere, thereby disposing said resultant Poincare vector in the equatorial plane of said sphere;
  e. means disposed in the paths of said secondary beams intermediate said dividing means and said combining means for creating a cycling difference between the phases of said secondary beams, whereby said resultant Poincare vector will describe a locus of orientation symmetrical about said antiparallel vectors;
  f. means for dividing said composite beam into a plurality of at least three tertiary beams, each of said tertiary beams comprising substantially the whole of the aperture of said composite beam;
  g. polarizing means disposed with respect to the whole of the apertures of each of said tertiary beams for modulating the intensity of each said beam according to the orientation of said resultant Poincare vector in said locus, said polarizing means being disposed with respect to each other so as to minimize the intensities of their respective tertiary beams at different orientations of said resultant Poincare vector; and
  h. means responsive to said modulation in the intensity of said tertiary beams to provide electrical signals corresponding to said intensity modulation.

2. An interferometer according to claim 1 wherein said primary light beam dividing means divides said primary beam into a pair of secondary beams having antiparallel Poincare sphere vectors.

3. An interferometer according to claim 2 wherein said means for orienting the Poincare sphere vectors of the secondary beam components of said composite beam into North-South disposition is disposed in substantially the whole of at least one of said primary beam, said composite beam, or said pair of secondary beams.

4. An interferometer according to claim 2 wherein said primary light beam is a laser beam, and said primary light beam dividing means comprises a polarizing beamsplitter so disposed in substantially the whole of the aperture of said primary beam and with respect to rotation about the axis of said primary beam as to divide said primary beam into a pair of secondary beams having said antiparallel Poincare vectors oriented in the equatorial plane of said Poincare sphere.

5. In an interferometer comprising a primary coherent light beam source, a polarizing beamsplitter for dividing a light beam from said source into first and second secondary component beams having antiparallel Poincare sphere vectors, means for varying the phase relationship between said first and second beams, means disposed respectively in said first and second beams for transposing the orientations of the Poincare vectors of said first and second beams, means for returning said first and second beams back to a common point on said beamsplitter, whereby said first and second beams which were initially respectively wholly passed and reflected by said beamsplitter are thereupon respectively wholly reflected and passed by said beamsplitter thereby forming a composite beam having a resultant Poincare vector, the orientation of said resultant vector being a function of said phase relationship between said first and second beams, the improvement which comprises means for distinguishing said resultant Poincare vector orientation, said distinguishing means comprising:
  a. means disposed in substantially the whole of the aperture of at least one of said primary, secondary or composite beams for orienting the antiparallel Poincare vectors of the first and second beam components of said composite beam into North-South disposition with reference to the Poincare sphere, thereby disposing said resultant Poincare vector in the equatorial plane of said sphere, said plane being coincident with the locus described by said resultant Poincare vector upon cycling variation in said phase relationship;
  b. means disposed in the path of said composite beam for dividing said composite beam into a plurality of at least three tertiary beams, each of said tertiary beams comprising substantially the whole of the aperture of said composite beam;
  c. polarizing means disposed with respect to the whole of the apertures of each of said tertiary beams for modulating the intensity of each said beam according to the orientation of said resultant Poincare vector in said locus, said polarizing means being disposed with respect to each other so as to minimize the intensities of their respective tertiary beams at different orientations of said resultant Poincare vector; and
  d. means responsive to said modulation in the intensity of said tertiary beams to provide electrical signals corresponding to said intensity modulation.

6. The improvement according to claim 5 including means for differencing at least two pairs of said electrical signals, thereby providing at least one pair of electrical signals, without DC components, useful as input signals for a reversible digital counter.

7. The improvement according to claim 5 wherein:
   a. said composite beam dividing means provides three tertiary beams;
   b. said polarizing means are so disposed with respect to each other as to provide minimized intensities of said tertiary beams at orientations of said resultant Poincare vector relatively disposed about said antiparallel vectors at azimuths of 0°, 90°, 180°, thereby providing intensity modulations varying in phase by increments of 90°; and
   c. means are provided for differencing those pairs of said electrical signals whose phases of modulation differ by 90°, thereby providing a pair of electrical signals, without DC components, useful as input signals for a reversible digital counter.

8. The improvement according to claim 5 wherein said composite beam dividing means comprises:
   a. a plurality of polarizing beamsplitters disposed in longitudinal array in substantially the whole of the path of said composite beam, said beamsplitters being so constructed as to substantially wholly transmit a beam of one Poincare vector orientation and reflect varying substantial portions of beams of other Poincare vector orientations, said plurality of beamsplitters being further variously disposed with respect to each other so as to wholly transmit beams of different ones of said Poincare vector orientations; and
   b. a separate photoelectric element disposed to receive light beams reflected from each of said plurality of beamsplitters, thereby providing a like plurality of separate detectable signals with respect to a plurality of resultant Poincare vector azimuths.

9. The improvement according to claim 8 wherein said orientation distinguishing means provides detectable signals with respect to resultant Poincare vector orientations relatively disposed at 0°, 90°, and 180° in the equatorial plane of the Poincare sphere.

10 The improvement according to claim 8 including means for differencing at least two pairs of said electrical signals, thereby providing at least one pair of electrical signals, without DC components, useful as input signals for a reversible digital counter.